United States Patent
Cowan (10) Patent No.: US 8,903,721 B1
(45) Date of Patent: Dec. 2, 2014

(54) SMART AUTO MUTE

(75) Inventor: Matthew Cowan, San Jose, CA (US)

(73) Assignee: Audience, Inc., Mountain View, CA (US)

(*) Notice: Subject to any disclaimer, the term of this patent is extended or adjusted under 35 U.S.C. 154(b) by 302 days.

(21) Appl. No.: 12/908,746

(22) Filed: Oct. 20, 2010

Related U.S. Application Data (60) Provisional application No. 61/266,131, filed on Dec. 2, 2009.

(51) Int. Cl.
*G10L 19/00* (2013.01)

(52) U.S. Cl.
USPC ........... 704/210; 704/206; 704/226; 704/216; 704/208

(58) Field of Classification Search
CPC ... G10L 19/00; G10L 19/0019; G10L 19/008; G10L 19/012; G10L 19/02; G10L 19/025; G10L 19/028; G10L 19/18; G10L 19/22; G10L 25/78; G10L 25/93; G10L 21/00; G10L 21/02; G10L 21/0208; G10L 21/0216
USPC .................. 704/210, 226, 215, 208, 206, 216
See application file for complete search history.

(56) References Cited

U.S. PATENT DOCUMENTS

| | | | |
|---|---|---|---|
| 5,555,306 A | 9/1996 | Gerzon | |
| 6,188,769 B1 | 2/2001 | Jot et al. | |
| 2002/0041678 A1* | 4/2002 | Basburg-Ertem et al. | 379/406.01 |
| 2003/0179888 A1* | 9/2003 | Burnett et al. | 381/71.8 |
| 2004/0076190 A1* | 4/2004 | Goel et al. | 370/516 |
| 2006/0092918 A1* | 5/2006 | Talalai | 370/352 |
| 2007/0025562 A1 | 2/2007 | Zalewski et al. | |
| 2007/0064817 A1* | 3/2007 | Dunne et al. | 375/241 |
| 2008/0247567 A1 | 10/2008 | Kjolerbakken et al. | |
| 2009/0060222 A1 | 3/2009 | Jeong et al. | |

OTHER PUBLICATIONS

International Search Report and Written Opinion dated Feb. 7, 2011 in Application No. PCT/US10/58600.

* cited by examiner

*Primary Examiner* — Qi Han
(74) *Attorney, Agent, or Firm* — Carr & Ferrell LLP (57) ABSTRACT

A mute setting is automatically set based on a speech detection result for acoustic signals received by a device. A device detects the speech based on a variety of cues from acoustic signals received using one or more microphones. If speech is detected within one or more frames, a mute setting may be automatically turned off. If speech is not detected, a mute setting may be automatically turned on. A mute setting may remain on as long as speech is not detected within the received acoustic signals. A varying delay may be implemented to help avoid false detections. The delay may be utilized during a mute-on state, and gradually removed during a transition from a mute-on state to a mute-off state.

18 Claims, 7 Drawing Sheets

SMART AUTO MUTE

CROSS-REFERENCE TO RELATED APPLICATIONS

This application claims the benefit of U.S. Provisional Application Ser. No. 61/266,131, titled "Audio Zoom," filed Dec. 2, 2009, the disclosure of which is incorporated herein by reference.

BACKGROUND OF THE INVENTION

A useful tool in audio communication is a mute function. When used, a mute function prevents any audio transmission from being communicated to a receiver device from a sending device. Typically, audio muting is manually engaged and disengaged by a user from an audio device that sends the audio.

Some audio systems attempt to implement an automatic mute, but the automatic mute function performs poorly. Existing automatic mute functions are based on detecting a level of the received signal. In these systems, if the signal level is greater than a threshold, the signal is sent. If the signal level is less than a threshold level, the signal is not sent. Hence, if a loud undesirable audio component is received in an audio signal, the signal will be sent regardless of the user's intent. If a user speaks into the audio device at a lower level, the signal is not sent.

To overcome the shortcomings of the prior art, there is a need for an improved muting system for use with audio communication.

SUMMARY OF THE INVENTION

The present technology automatically sets a mute setting based on detected speech within acoustic signals received by a device. The device detects the speech based on a variety of cues, using one or more microphones. If speech is detected within one or more frames, a mute is automatically turned off. If speech is not detected, a mute is automatically turned on. A mute remains on as long as speech is not detected within the received acoustic signals. A varying delay may be implemented to help avoid false detections. The delay may be utilized during mute on, and gradually removed during a mute off.

An embodiment may be implemented to process an audio signal. An acoustic signal may be received by an audio device. The system may detect whether a speech component is present in the acoustic signal. A transmission of the acoustic signal may be muted based on the detection of the speech component.

A system for performing noise reduction in an audio signal may include memory, a speech detection module, and a mute state decision module. The speech detection module may be stored in the memory and executed by a processor to determine one or more cues from a received acoustic signal. The mute state decision module may be stored in the memory and executed by a processor to set a mute state based on the determined cues.

DETAILED DESCRIPTION OF THE INVENTION

The present technology automatically sets a mute setting based on a speech detection result for acoustic signals received by a device. The device detects the speech based on a variety of cues from acoustic signals received using one or more microphones. If speech is detected within one or more frames, a mute setting may be automatically turned off. If speech is not detected, a mute setting may be automatically turned on. A mute setting may remain on as long as speech is not detected within the received acoustic signals. A varying delay may be implemented to help avoid false detections. The delay may be utilized during a mute-on state, and gradually removed during a transition from a mute-on state to a mute-off state.

Figure 1:
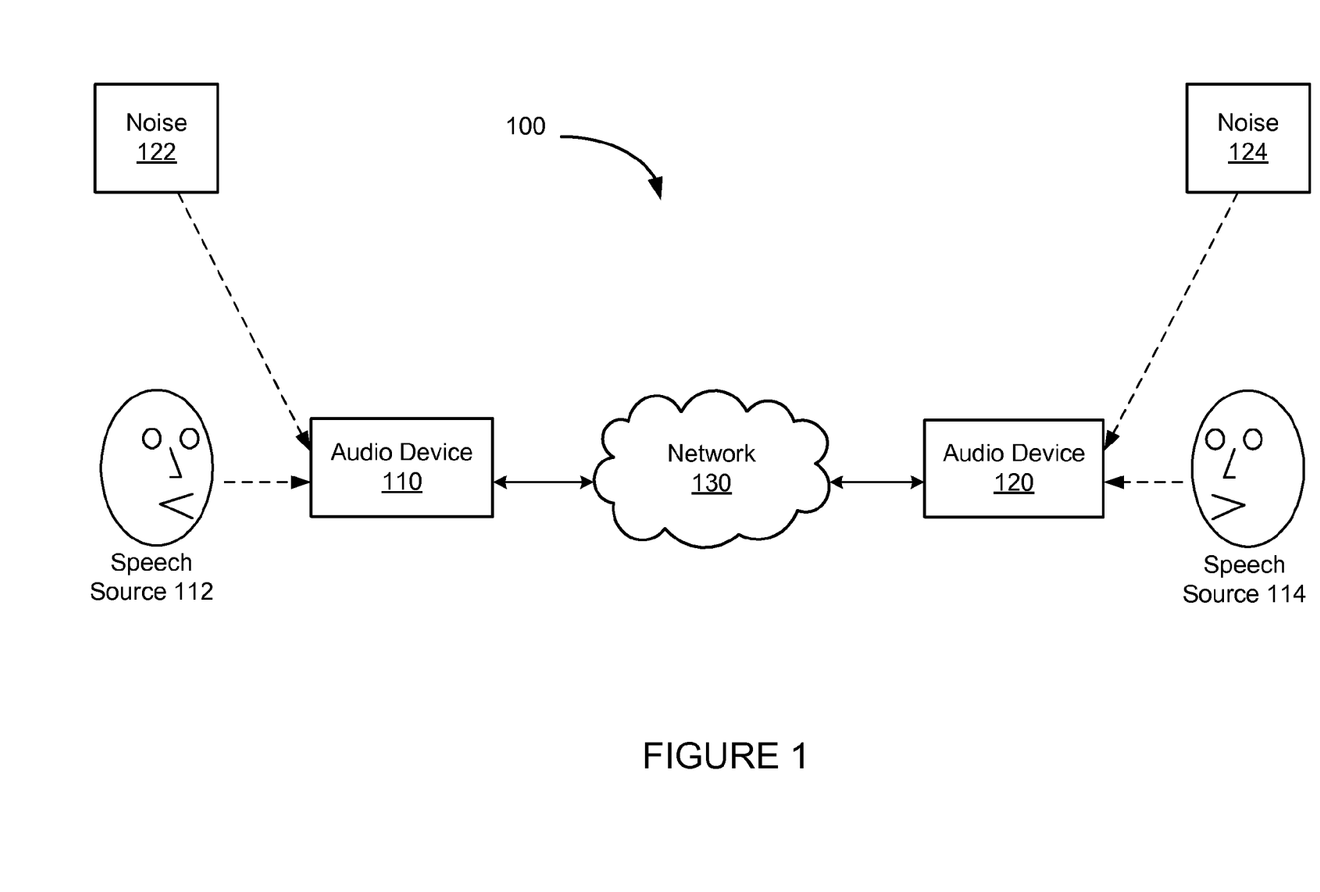
FIG. 1 is a block diagram of an exemplary system in which the present technology can be used.

FIG. 1 is a block diagram of an exemplary system in which the present technology may be used. The system 100 of FIG. 1 includes audio device 110, audio device 120, and network 130.

Audio device 110 may be implemented as any device capable of sending and receiving an audio signal, such as for example a mobile device, a smart phone, a car phone, or any computing device capable of communicating audio signals. Audio device 110 may receive acoustic signals from speech source 112, noise 122 and other sources of audio within an audio range of audible device 110. Audio device 120 may receive acoustic signals from speech source 114 and noise 124 and may receive a muted signal or an unmuted signal from audio device 110. Similarly, audio device 110 may receive a muted signal or unmuted signal from audio device 120.

Audio device 110 may implement an automatic mute function that operates based on detection of a desired audio component, such as speech. Speech source 112 may be any source of desirable audio content, such as for example a user of audio device 110 who is speaking into audio device 110. Noise 122 may be any audio content undesirable for sending over network 130, such as for example other people within the vicinity of speech source 112, environment noise such as a car or other ambient noise, echo, and other noise sources.

Network 130 may be implemented as any network capable of communicating an audio signal between audio device 110 and audio device 120. Network 130 may be implemented as, for example, a cellular phone network, a plain old telephone service (POTS) network, or some other network.

Figure 2:
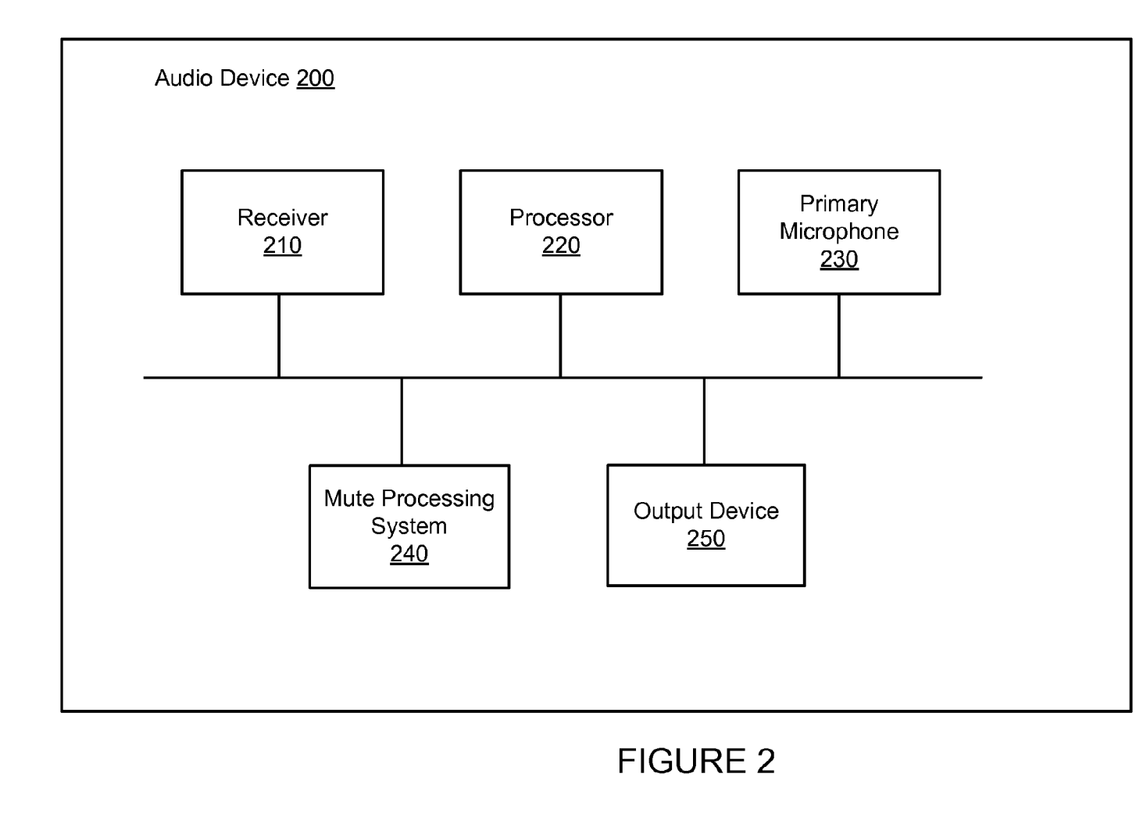
FIG. 2 is a block diagram of an exemplary audio device.

FIG. 2 is a block diagram of an exemplary audio device. The audio device 200 of FIG. 2 may provide more detail for audio devices 110 and 120 of FIG. 1. In the illustrated embodiment, the audio device 200 includes receiver 210, processor 220, primary microphone 230, mute processing system 240, and an output device 250. The audio device 200 may include further or other components necessary for audio device operation. Similarly, the audio device 200 may include fewer components that perform similar or equivalent functions to those depicted in FIG. 2.

Processor 220 may execute instructions and modules stored in a memory (not illustrated in FIG. 2) in the audio device 200 to perform functionality described herein, including noise reduction and mute processing for an acoustic signal. Processor 220 may include hardware and software implemented as a processing unit, which may process floating point operations and other operations for the processor 220.

The exemplary receiver 210 may be configured to receive a signal from network 130. In some embodiments, the receiver 210 may include an antenna device. The signal may then be forwarded to the mute processing system 240 to process the audio signal, such as for example to reduce noise in the signal and determine a mute state, and provide an audio signal to output device 250. Receiver 210 may also be used to transmit a signal from audio device 200 to another audio device via a network. The present technology may be used in one or both of a transmit path and receive path of the audio device 200.

Primary microphone 230 may be an omni-directional, a directional microphone, or another type of microphone. Primary microphone 230 may receive acoustic signals and provide the signals to other portions of audio device 200 for processing.

The mute processing system 240 is configured to receive the acoustic signals from acoustic sources via the primary microphone 230 and process the acoustic signals. Processing may include performing noise reduction within an acoustic signal and additional processing based on a mute state of the signal. The acoustic signal received by primary microphone 230 may be converted into one or more electrical signals, such as for example a primary electrical signal and a secondary electrical signal. The electrical signal may be converted by an analog-to-digital converter (not shown) into a digital signal for processing in accordance with some embodiments. The primary acoustic signal may be processed by the mute processing system 240 to produce a signal with an improved signal-to-noise ratio. The mute processing system 240 is discussed in more detail below.

The output device 250 may include any device which provides an output to the user. For example, the output device 250 may include an audio output device such as a speaker, an earpiece of a headset or handset, or a speaker on a conference device. The output device 250 may also include a visual or other type of output device, such as a touch screen, vibration mechanism, or other output.

Though illustrated with a single microphone, audio device 200 of FIG. 2 may be implemented with two or more microphones.

Figure 3:
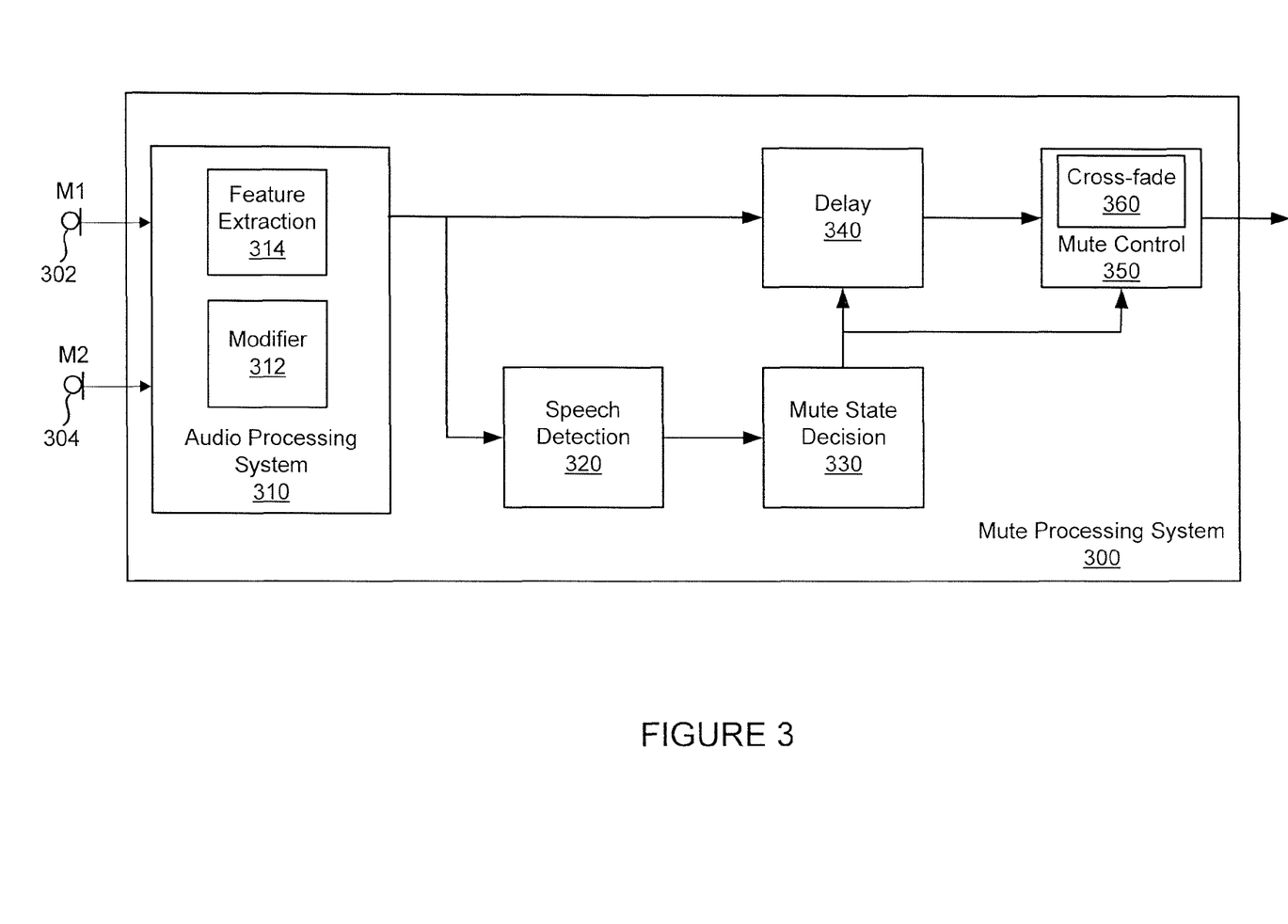
FIG. 3 is a block diagram of an exemplary mute processing system.

FIG. 3 is a block diagram of an exemplary mute processing system. Mute processing system 300 may be used to implement mute processing system 240 of the system of FIG. 2. Mute processing system 300 includes audio processing system 310, speech detection module 320, mute state decision module 330, delay module 340, and mute control 350.

Audio processing system 310 may receive acoustic signals from a microphone 302, which may be implemented as primary microphone 230. After receiving acoustic signals through one or more microphones, audio processing system may process the acoustic signals to provide a noise reduced signal. Processing the acoustic signals may include performing a frequency analysis on the received acoustic signals to transform time-domain signals to a frequency domain, extracting features from the frequency domain signals, generating a mask, modifying the frequency domain signals using the mask, reconstructing an acoustic signal in a time domain, and performing post processing of the signal. An audio processing system suitable for use with the present technology is described in more detail in U.S. patent application Ser. No. 12/860,043, titled "Monaural Noise Suppression Based on Computational Auditory Scene Analysis", filed Aug. 20, 2010, the disclosure of which is incorporated herein by reference.

Audio processing system 310 may also receive acoustic signals from one or more microphones, in addition to primary microphone 230, such as microphone 304 illustrated in FIG. 3. For an audio device that utilizes two or more microphones, a suitable system for implementing audio processing system 310 is described in U.S. patent application Ser. No. 12/832,920, titled "Multi-Microphone Robust Noise Suppression", filed on Jul. 8, 2010, the disclosure of which is incorporated herein by reference.

As illustrated in FIG. 3, audio processing system 310 may include feature extraction module 314 and modifier 312. Additional and/or fewer modules may be included in audio processing system 310. The additional modules may be utilized to reduce noise and cancel echo in acoustic signals received by audio processing system 310.

Feature extraction module 314 may be implemented in audio processing system 310 and/or speech detection module 320, or provide extracted features to speech detection module 320. Modifier 312 may perform the actual removal of noise and echo cancellation within the acoustic signals received by audio processing system 310.

Speech detection module 320 may receive a noise reduced and echo cancelled signal from audio processing system 310 and may detect if a desired component exists in the signal. The desired component on which the mute state may be based can be speech or some other desirable component. Speech detection module 320 may detect a speech component based on detection of one or more cues. The cues may include pitch, loudness, harmonics, an inter-aural level difference (ILD), or some other cue which may be calculated from the received acoustic signal. Speech detection module 320 may output information regarding the cues to mute state decision module 330.

Mute state decision module 330 determines a mute state setting based on cues received from speech detection module 320. The state decision may be performed per frame of an acoustic signal. For example, if any of the pitch, loudness, harmonics, or ILD cues satisfy a threshold for a particular frame, speech may be present in the current frame. Speech may also be determined to be present if the value for each cue satisfies a threshold associated with the particular cue. The state decision may also be based on information for more than one frame. Hence, if two or more frames are detected to have speech (per one or more cues), then the current state may automatically set to a mute-off state. Once a state is determined, mute state decision module 330 generates an indication of the current state and transmits the indication to delay module 340 and mute control module 350.

Delay module 340 may provide a variably delayed audio signal. When a mute state is set to on, delay module 340 may implement a delay, such as for example between 10 ms-5 seconds. When a mute state is set to off, delay module 340 may compress speech to gradually remove an existing delay over time. Delay module 340 receives a processed acoustic signal from audio processing system 310 and provides the acoustic signal to mute control module 350 with a corresponding delay based on the current mute state.

Mute control module 350 receives an acoustic signal with some type of delay from delay module 340 and a mute state indication signal from Mute state decision module 330. Mute control module 350 then outputs an audio signal having speech or a muted signal based on the indicated state. The mute signal may be a signal with no energy, or may include comfort noise generated by the present system. When transitioning between a mute-on and a mute-off state, or vice versa, mute control may implement a cross-fade to smooth the transition.

All or a portion of mute processing system 300 may be implemented in an audio device that transmits or receives an audio signal, such as audio devices 110 and 120. Additionally, all or a portion of mute processing system 300 may be implemented in network 130. For example, modules 320 through 360 may be implemented in network 130 to implement an automatic muting system within the network. In this case a user may engage the muting system implemented within the network from a mobile device, or the network may engage the muting system based on other input.

Figure 4:
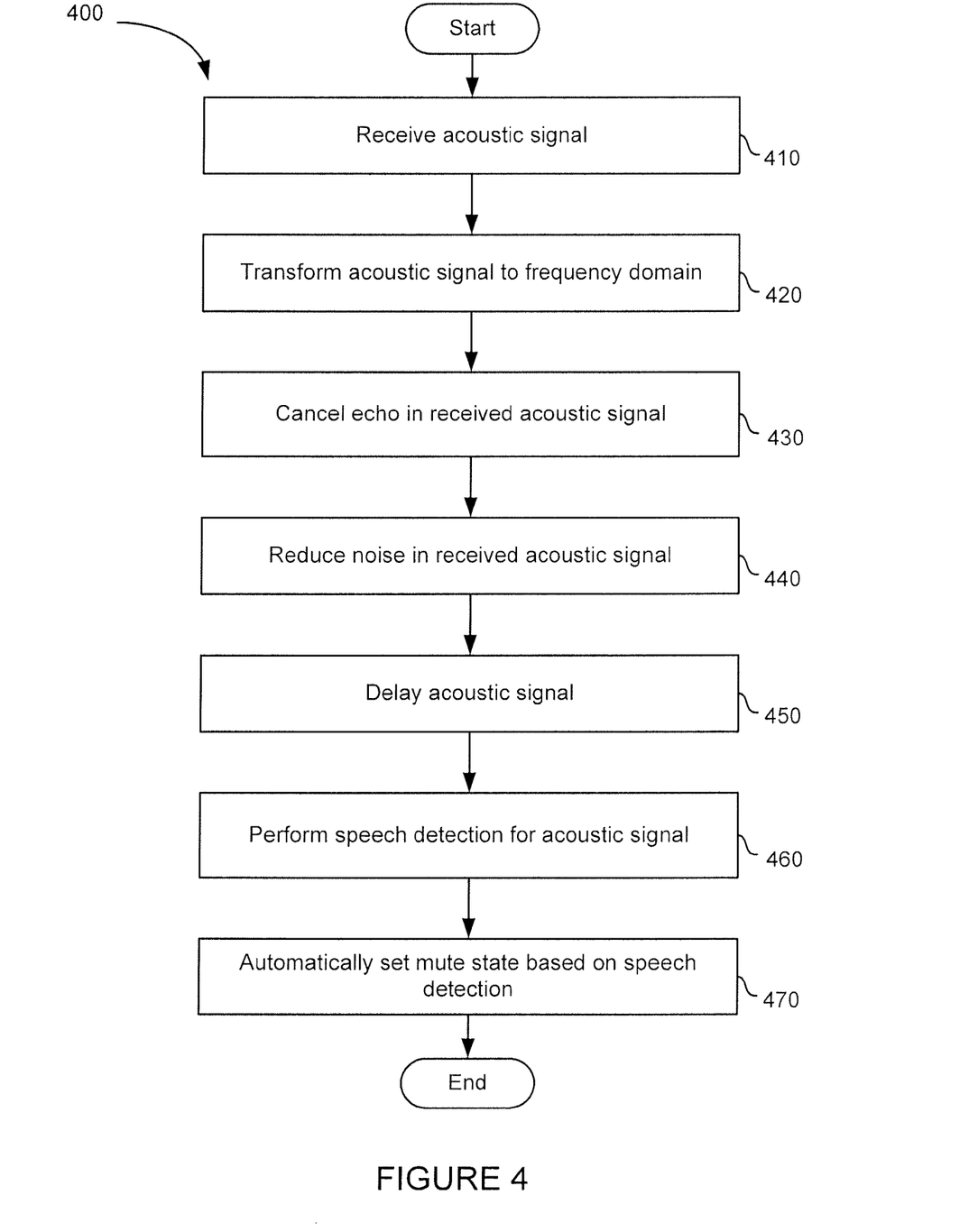
FIG. 4 is a flow chart of an exemplary method for automatically setting a mute state.

FIG. 4 is a flow chart of an exemplary method for automatically setting a mute state. The method 400 of FIG. 4 is performed by mute processing system 300. Though the method 400 of FIG. 4 will be discussed with respect to an audio device, the method, or a variation of the method, may be implemented by network 130.

An acoustic signal is received at step 410. The acoustic signal may be received by one or more microphones of audio device 110. The received acoustic signal may be transformed to a frequency domain at step 420. The transformation from the time domain signal to the frequency domain may include generating two or more sub-band signals in the frequency domain.

Echo may be canceled from the received acoustic signal at step 430. An echo component may be detected and canceled by the mute processing system, such as for example by audio processing system 310. A suitable method for detecting and canceling echo is described in more detail in U.S. patent application Ser. No. 12/077,436, titled "System and Method for Envelope-Based Acoustic Echo Cancellation," filed Mar. 18, 2008, the disclosure of which is incorporated herein by reference.

Noise may be reduced in the received acoustic signal at step 440. Performing noise reduction may include extracting one or more features and modifying the acoustic signal to reduce the noise based on the extracted features.

The received acoustic signal may be delayed at step 450. The delay may be implemented by delay module 340. An initial delay may or may not be set, and any delay for the received signal may be varied at a later time, such as for example based on the set mute state. When a mute-on state is set, the delay may be started (or maintained) for a suitable period of time to allow for detecting speech in a received signal. An example of a delay for a mute-on state may be between five milliseconds and five seconds. When a mute-off state is set, the delay may be adjusted, for example, by reducing the delay. The varying delay may be configured when automatically implementing different mute states as discussed in more detail below.

Speech detection is performed for an acoustic signal at step 460. Speech may be detected based on one or more cues derived from an audio signal by speech detection module 320. Detecting speech in an acoustic signal is discussed in more detail below with respect to the method of FIG. 5. After determining whether speech has been detected, a mute state may be automatically set based on the speech detection at step 470. The mute state may be set to a mute-off state if one or more of pitch, loudness, harmonic, and ILD cues satisfy a threshold. Otherwise, a mute-on state is set. After setting a mute state, the state is implemented by portions of mute processing system 300. Implementing a mute-on state is described with respect to FIG. 6 and implementing a mute-off state as described with respect to FIG. 7.

Figure 5:
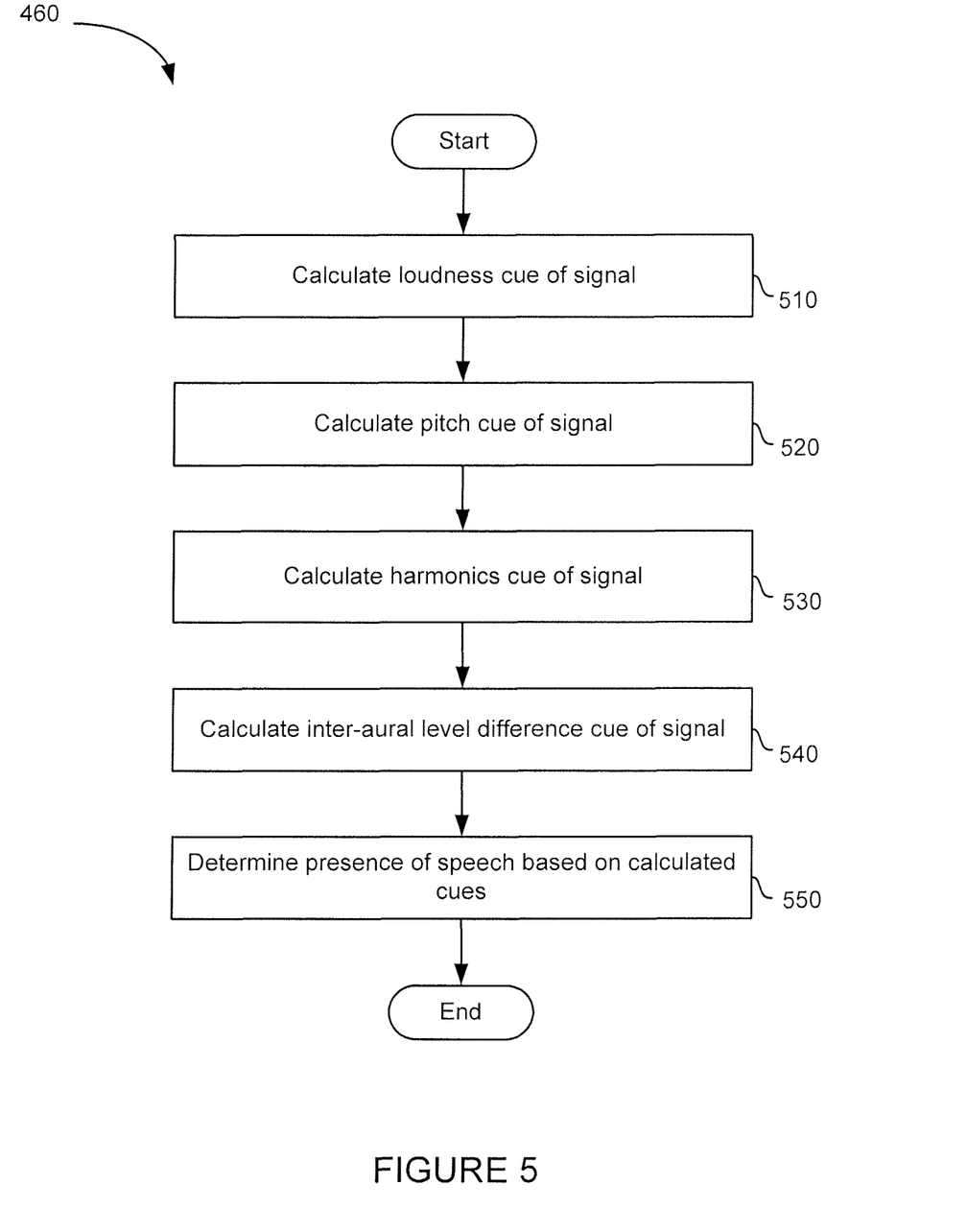
FIG. 5 is a flow chart of an exemplary method for performing speech detection in an acoustic signal.

FIG. 5 is a flow chart of an exemplary method for performing speech detection in an acoustic signal. The method of FIG. 5 provides more detail for step 460 in the method of FIG. 4 and may be implemented by speech detection module 320. In some embodiments, the method of FIG. 5 may be performed per frame for a received acoustic signal.

A loudness cue is calculated for a received signal at step 510. The loudness cue may be determined as the energy of the signal within a current frame or one or more sub-bands within the current frame. A pitch may be calculated for the received signal at step 520. The pitch may be calculated per sub band or for an entire frame. A harmonics cue may be calculated for the received signal at step 530. Harmonics may be determined for one or more frequencies within a particular sub band or for an entire frame of the received audio signal. An ILD cue may be calculated for a signal at step 540. The ILD may be determined for an audio device having two or more microphones.

After calculating one or more cues, the presence of speech is determined based on the calculated cues at step 550. Speech may be determined to be present if any of the cues, such as pitch, harmonics, or an ILD satisfy a respective threshold. Alternatively, speech may be determined to be present if two or more of the cues satisfy a threshold, such as loudness and one other cue, or if all the cues satisfy a respective threshold.

Figure 6:
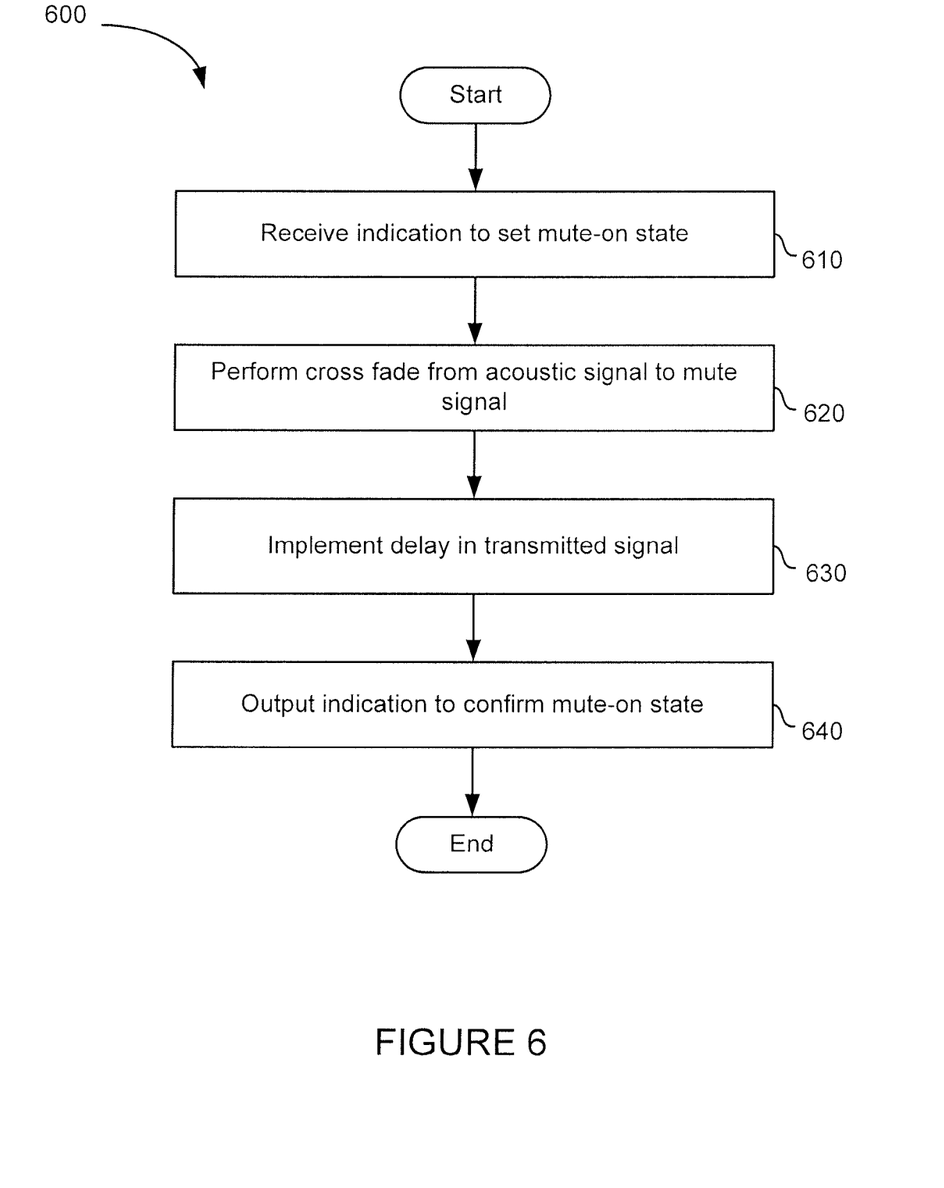
FIG. 6 is a flow chart of an exemplary method for implementing a mute-on state.

FIG. 6 is a flow chart of an exemplary method for implementing a mute-on state. An indication is received to set a mute-on state at step 610. The indication may be sent by mute state decision module 330 and received by delay module 340 and mute control module 350. The indication may be implemented as a control signal, an enable signal or some other signal.

A cross fade may be performed from an acoustic signal to a mute signal at step 620. The cross fade may be performed slowly in order to ensure that no additional speech is forthcoming. For example, the cross fade may be performed over a period of 1 to 5 seconds, such that if additional speech is detected during the cross fade, the system may quickly ramp up to provide the acoustic signal having the detected speech.

After performing a cross fade to a mute signal, a delay may be implemented in the transmitted signal at step 630. The delay may be implemented during the mute-on state by delay module 340. The delay may range from, for example, between 5 milliseconds and 5 seconds.

A state indication may be output to confirm a mute-on state at step 640. During a mute-on state, the present technology may provide a state indication to a user of the device from which a signal is being muted. The state indication may be an audio, visual, vibration, or some other indication of the current state or a state change. For example, the indication may be a tone output by an audio device, a visual indicator within an output display of the current device, or some other indication.

Figure 7:
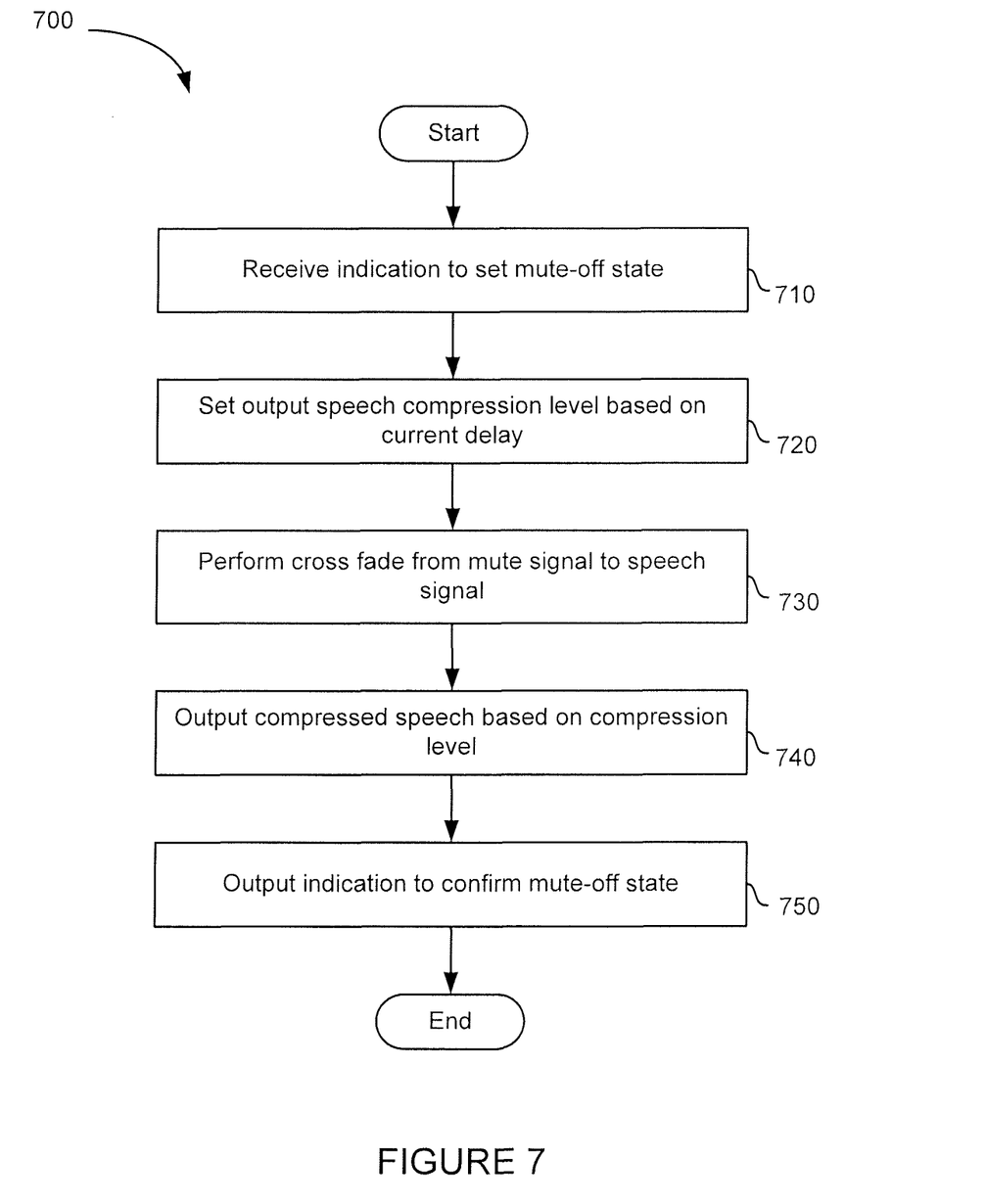
FIG. 7 is a flow chart of an exemplary method for implementing a mute-off state.

FIG. 7 is a flow chart of an exemplary method 700 for implementing a mute-off state. First, an indication is received to set a mute-off state at step 710. The indication may be sent by mute state decision module 330 to delay module 340 and mute control module 350. An output speech compression level may be set based on the current delay at step 720. For example, if the current delay is 500 milliseconds, the detected speech may be compressed to reduce the latency until the 500 millisecond delay is absent within 1 second of speech playback. One suitable method for converting audio signal sample rate to utilize for signal compression is described in the ASRC Patent Application (U.S. patent application Ser. No. 12/790,552, entitled "Asynchronous Sample Rate Converter").

A cross fade is performed from a mute signal to an acoustic signal having speech at step 730. The cross fade may transition between a muted and an un-muted signal, for example, over a time period of 5 to 20 milliseconds.

The mute signal may be no signal, or may be a signal that includes a comfort noise component. The comfort noise component may be generated by mute processing system 300, and may for example include pink noise.

Compressed speech is output based on the compression level at step 740. The output may be compressed speech until the delay is absent according to the speech compression level. After that, the output may include uncompressed speech. An indication may be output to one or more devices to confirm the mute-off state at step 750. The output indication to confirm the mute-off state may be similar to the indication sent at step 640, but may indicate a mute-off state rather than a mute-on state The above described modules, including those discussed with respect to FIGS. 2-3, may include instructions stored in a storage media such as a machine readable medium (e.g., computer readable medium). These instructions may be retrieved and executed by the processor 220 to perform the functionality discussed herein. Some examples of instructions include software, program code, and firmware. Some examples of storage media include memory devices and integrated circuits.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for processing an audio signal, comprising:
    detecting, using at least one computer processor, whether a speech component is present in a received acoustic signal, the detecting of the speech component being based on a level difference between the received acoustic signal and a second received acoustic signal;
    muting a transmission of the received acoustic signal based on the detection of the speech component, a mute-off state being set in response to the detection of the speech component; and
    providing a delay between the received acoustic signal and the transmitted acoustic signal based on the detection of the speech component in the received acoustic signal, the delay being fixed during a mute-on state and being reduced during a transition to the mute-off state.

2. The method of claim 1, further comprising transforming the received acoustic signal to a frequency domain signal, the detecting whether the speech component is present in the received acoustic signal being performed on the received acoustic signal after being transformed to the frequency domain signal.

3. The method of claim 1, further comprising cancelling an echo component in the received acoustic signal, the detecting whether the speech component is present in the received acoustic signal being performed on the received acoustic signal after the echo component is canceled.

4. The method of claim 3, further comprising reducing a noise component in the received acoustic signal, the detecting whether the speech component is present in the received acoustic signal being performed on the received acoustic signal after the noise component is reduced.

5. The method of claim 1, further comprising reducing a noise component in the received acoustic signal, the detecting whether the speech component is present in the received acoustic signal being performed on the received acoustic signal after the noise component is reduced.

6. The method of claim 1, wherein the delay is adjusted to reduce a latency between a time the acoustic signal is received and a time the transmitted acoustic signal is transmitted.

7. The method of claim 1, wherein the detecting of the speech component is further based on a loudness attribute and a pitch attribute of the received acoustic signal.

8. The method of claim 1, wherein the mute-on state is set in response to the speech component not being detected.

9. The method of claim 1, further comprising providing an indication through an output of an audio device, the indication based on a mute state derived from the detecting of the speech component.

10. A non-transitory computer readable storage medium having embodied thereon a program, the program being executable by a processor to perform a method for processing an audio signal, the method comprising:
    detecting whether a speech component is present in a received acoustic signal, the detecting of the speech component being based on a level difference between the received acoustic signal and a second received acoustic signal;
    muting a transmission of the received acoustic signal based on the detection of the speech component, a mute-off state being set in response to the detection of the speech component; and
    providing a delay between the received acoustic signal and the transmitted acoustic signal based on the detection of the speech component in the received acoustic signal, the delay being fixed during a mute-on state and being reduced during a transition to the mute-off state.

11. The non-transitory computer readable storage medium of claim 10, the method further comprising transforming the received acoustic signal to a frequency domain signal, the detecting whether the speech component is present in the received acoustic signal being performed on the received acoustic signal after being transformed to the frequency domain signal.

12. The non-transitory computer readable storage medium of claim 10, the method further comprising cancelling an echo component in the received acoustic signal, the detecting whether the speech component is present in the received acoustic signal being performed on the received acoustic signal after the echo component is canceled.

13. The non-transitory computer readable storage medium of claim 10, the method further comprising reducing a noise component in the received acoustic signal, the detecting whether the speech component is present in the received acoustic signal being performed on the received acoustic signal after the noise component is reduced.

14. The non-transitory computer readable storage medium of claim 10, wherein the delay is adjusted to reduce a latency between a time the acoustic signal is received and a time the transmitted acoustic signal is transmitted.

15. The non-transitory computer readable storage medium of claim 10, wherein the detecting of the speech component is further based on a loudness attribute and a pitch attribute of the received acoustic signal.

16. The non-transitory computer readable storage medium of claim 10, the method further comprising providing an indication through an output of an audio device, the indication based on a mute state derived from the detecting of the speech component.

17. A system for performing noise reduction, the system comprising:
    a memory;

a speech detection module stored in the memory and executable using a processor to determine one or more cues from a received acoustic signal and a second received acoustic signal, at least one of the cues being a level difference between the received acoustic signal and the second received acoustic signal;

a mute state decision module to set a mute state based on the determined one or more cues, a mute-off state being set in response to the determined one or more cues indicating a speech component; and a delay module to provide a delay between the received acoustic signal and a transmission of the received acoustic signal based on the mute state, the delay being fixed during a mute-on state and being reduced during a transition to the mute-off state.

18. The system of claim 17, wherein the mute state decision module sets a mute-on state in response to the determined one or more cues not indicating the speech component.

\* \* \* \* \*